Jan. 14, 1941.　　　　K. F. TROMP　　　　2,228,739
MEANS FOR DISTRIBUTING AND MIXING LIQUIDS
Filed March 12, 1938　　　3 Sheets-Sheet 1
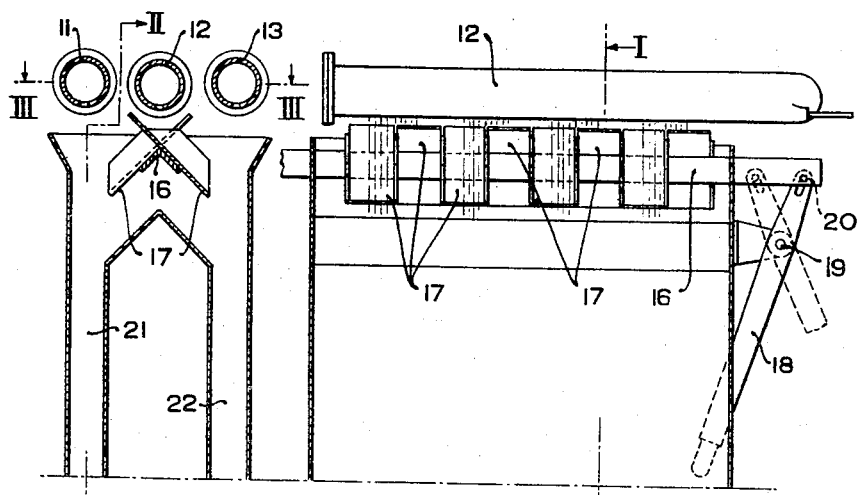
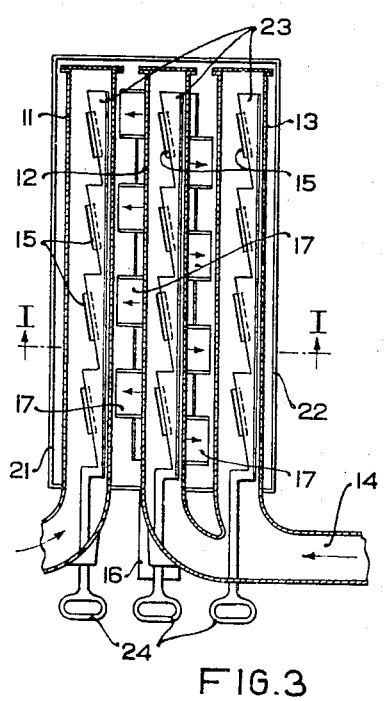
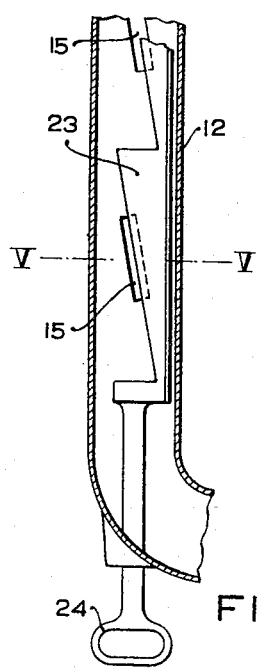
INVENTOR
KLAAS F. TROMP
By: Haseltine, Lake & Co.
ATTORNEYS Jan. 14, 1941. K. F. TROMP 2,228,739
MEANS FOR DISTRIBUTING AND MIXING LIQUIDS
Filed March 12, 1938 3 Sheets-Sheet 2

INVENTOR
KLAAS F. TROMP
By: Haseltine, Lake & Co.
ATTORNEYS

Patented Jan. 14, 1941

2,228,739

UNITED STATES PATENT OFFICE 2,228,739

MEANS FOR DISTRIBUTING AND MIXING LIQUIDS

Klaas F. Tromp, Kerkrade, Netherlands

Application March 12, 1938, Serial No. 195,474
In Germany April 27, 1937

4 Claims. (Cl. 137—165)

This invention relates to means for distributing and mixing liquids.

The primary object of my invention is an improved means, whereby liquid supplied by a conduit can be divided into two portions, adapted to being varied in very accurate proportion within predetermined limits, at a ratio from between 1:0 and 0:1.

Another object of my invention is a device, including the aforesaid improved distributing means, whereby liquid supplied by two conduits can be evenly mixed in accurately variable proportions.

With these and other objects in view, my invention consists in the provision in combination with a device for distributing a liquid with a distributor mounted vertically below the same, of a substantially horizontal conduit for supplying the liquid to be distributed and having its bottom provided with a longitudinal series of spaced substantially longitudinal slots, and having said distributor mounted for and capable of lengthwise movement relative to the series of slots and composed of pairs of adjacent transverse chutes arranged side by side longitudinally to said series each pair of corresponding to a slot and the chutes of each pair sloping downwardly, one towards the left and the other towards the right of the conduit, the total width of each pair of chutes as measured in the longitudinal direction of the conduit exceeding the length of the corresponding slot measured in the same direction.

Figure 6:
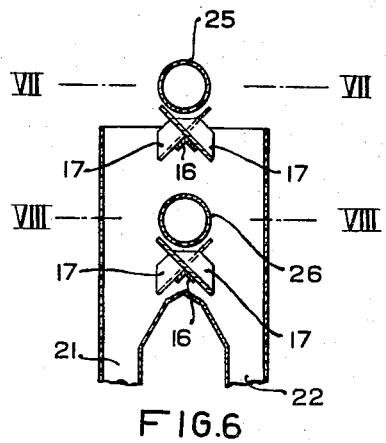
Figures 7, 8:
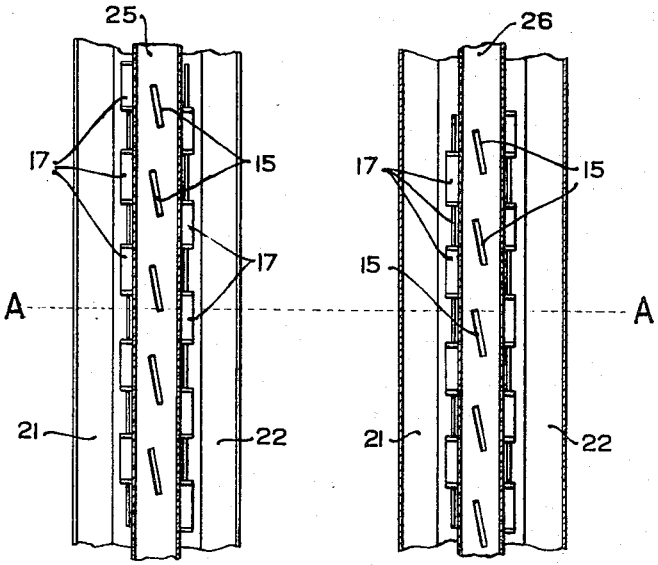
Figure 9:
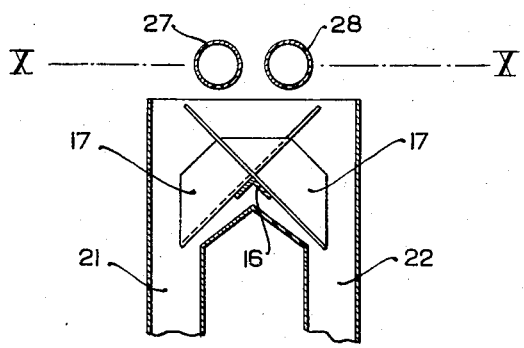
Figure 10:
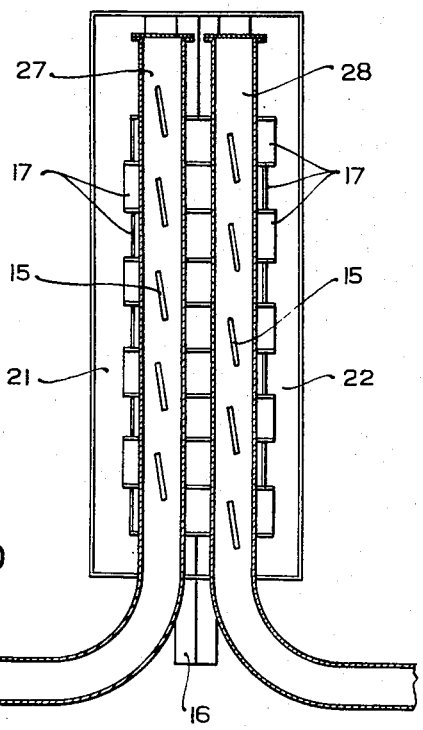

Other features of my invention will appear from the following description of some practical embodiments and from the drawings, in which:

Fig. 1 is a vertical cross sectional view along the line I—I in Fig. 3, of the first embodiment, Fig. 2 is a vertical longitudinal sectional view along the line II—II in Fig. 1, Fig. 3 is a plan sectional view along the line III—III in Fig. 1, Fig. 4 is a plan sectional view along the line IV—IV in Fig. 5, of a supply conduit as shown in Fig. 1, and Fig. 5 is a cross sectional view along the line V—V in Fig. 4, Fig. 6 is a vertical cross sectional view of a second embodiment, Fig. 7 is a plan sectional view along the line VII—VII in Fig. 6, and Fig. 8 is a plan sectional view along the line VIII—VIII in Fig. 6, Fig. 9 is a vertical cross section of a third embodiment, and Fig. 10 is a plan sectional view along the line X—X in Fig. 9.

Referring to Figs. 1-5, which illustrate my improved distributing means as applied to a distributing and mixing device, there are provided three parallel, horizontal conduits 11, 12, 13 mounted side by side and in spaced relationship. Conduit 11 is fed with liquid and conduits 12, 13 are fed, by a common pipe 14, with another liquid, which liquids are to be mixed in variable proportions.

As particularly shown in Fig. 3, each conduit is provided, in its bottom, with a longitudinal series of four substantially longitudinal slots 15 of equal lengths and spaced at intervals equal to said length. The axes of the slots make equal, relatively small acute angles with the axes of the conduits.

Mounted vertically below conduit 12 is a distributor, comprising an angle bar 16, secured to which are eight transverse, inclined chutes 17 located side by side and alternately sloping down to the right hand side and to the left hand side of the conduit. The width of each chute 17 is equal to the length of the slots 15 and of the intervals between two adjacent slots, the arrangement being such that each slot 15 cooperates with a pair of chutes 17 sloping down in opposite directions.

The distributor is adapted for lengthwise movement by means of a hand lever 18 (Fig. 2), mounted on a horizontal pivot 19 and having a pin and slot connection 20 with the angle bar 16. In the one extreme position of the distributor, the liquid discharged by each slot 15 is received entirely by the left hand side chute, in the other extreme position it is received entirely by the right hand side chute, and in an intermediate position it is received partly by the right hand side, partly by the left hand side chute of the corresponding pair of chutes 17. The ratio between the amounts discharged by the one and by the other chute 17 of each pair depends exclusively upon the adjustment of the distributor.

Conduits 11 and 13 do not cooperate with a distributor.

Vertically below the conduits 11 and 13 are narrow, elongated receptacles 21 and 22, respectively. Receptacle 21 receives the total amount of liquid discharged by conduit 11 in addition to a controllable proportion of the liquid discharged by conduit 12 into the distributor, whereas receptacle 22 receives the full amount of liquid discharged by conduit 13 in addition to the remainder of the liquid discharged by conduit 12 into the distributor.

Each conduit is provided with a slide valve 23 located within the conduit and provided, outside the conduit, with a handle 24, by means of which it can be moved in axial direction, special reference being had to Figs. 4 and 5. One lateral edge of said valve is saw teeth shaped and each saw tooth cooperates with one of the slots 15 in such a manner that axial movement of the slide valve results in a very gradual increase or decrease of the effective sectional areas of the slots. In the extreme positions of the valve 23, the slots are fully open and fully closed, respectively. Thus, by means of said slide valves the total amount of liquid discharged per unit of time by each of the conduits 11, 12, 13 can be individually controlled as circumstances require.

Figs. 6–8 illustrate how, by combining two distributing means in accordance with my invention, a device is created whereby two liquids can be mixed in accurately variable proportions. To this end I provide two vertically spaced conduits 25, 26 fed by different liquids. Each conduit is provided with outlet slots 15 in the manner described hereinbefore and cooperates with an individual slidable distributor 16, 17 in such a manner that the liquid from each of said conduits can be caused to flow, in a controlled proportion, into the receptacles 21 and 22. The line A—A in Figs. 7 and 8 serves to clearly show that the slots 15 in conduit 25 are located in staggered relation to those in conduit 26, although this is not necessary. As to the two distributors, these may be arranged to be controllable individually, or in unison. Figs. 9 and 10 show another embodiment of a mixing device, wherein two horizontally spaced conduits 27 and 28, fed by different liquids and provided with outlet slots 15, cooperate with a common slidable distributor 16, 17, the slots of the one series being staggered with respect to the slots of the other series. It will be seen that in this arrangement each of both liquids can also be caused to flow, in a controlled proportion, into the receptacles 21 and 22.

What I claim is:

1. In the combination of a device for distributing a liquid with a distributor mounted vertically below the same, the features comprising a substantially horizontal conduit for supplying the liquid to be distributed having its bottom provided with a longitudinal series of spaced substantially longitudinal slots, and having said distributor mounted for and capable of lengthwise movement relative to the series of slots and composed of pairs of transverse chutes arranged side by side in the longitudinal direction of said series, each pair being individual to a slot and the chutes of each pair sloping down the one towards the left hand side and the other towards the right hand side of the conduit, the total width of each pair of chutes as measured in the longitudinal direction of the conduit exceeding the length of the corresponding slot measured in the same direction.

2. In a device for distributing a liquid in accordance with claim 1, a valve associated with the conduit and capable of movement independently of the distributor to vary the effective cross sectional areas of the slots.

3. A device for distributing a liquid in accordance with claim 1, including a valve associated with the conduit and capable of movement independently of the distributor to vary the effective cross sectional areas of the slots, and wherein the slots are disposed at small angles with the longitudinal axis of the conduit and the valve is provided with effective cut-off edges in parallel relation with the side edges of the slots.

4. In apparatus for mixing two liquids in variable proportions and including a distributor for distributing the liquids, the combination of two substantially horizontal parallel conduits each having its bottom provided with a longitudinal series of spaced substantially horizontal slots and mounted side by side in such manner that the slots of the one conduit are disposed in staggered relation to those of the other conduit, the distributor being common to and mounted vertically below, and between, said conduits, and being capable of lengthwise movement relative to said series and composed of pairs of transverse chutes arranged side by side longitudinally, each pair of chutes being individual to a slot in the one conduit and to a slot in the other conduit and the chutes of each pair sloping down the one towards the left hand side and the other towards the right hand side of the conduits, the total width of each pair of chutes as measured in the longitudinal direction of the conduit exceeding the length of one of the two slots to which it is individual.

KLAAS F. TROMP.